United States Patent [19]
Willis

[11] Patent Number: 5,470,037
[45] Date of Patent: Nov. 28, 1995

[54] APPARATUS FOR SELF-ADMINISTERING FLUIDS IN PATIENTS, CHILDREN AND PERSONS OF LIMITED CAPABILITIES

[76] Inventor: Rodney L. Willis, 692 Shrewsbury Rd., Leitchfield, Ky. 42754

[21] Appl. No.: 109,544

[22] Filed: Aug. 20, 1993

[51] Int. Cl.$^6$ .................................................. F16L 3/00
[52] U.S. Cl. ................... 248/125.9; 248/409; 248/415; 403/84
[58] Field of Search ............................ 248/121, 122, 248/124, 125, 161, 409, 413, 415, 416, 176, 286; 403/84, 85, 94, 92

[56] References Cited

U.S. PATENT DOCUMENTS

| | | | |
|---|---|---|---|
| 612,097 | 10/1898 | Goodwin | 248/121 X |
| 1,571,959 | 2/1926 | Mulligan | 248/122 |
| 1,732,508 | 10/1929 | Farris | 403/92 X |
| 2,696,963 | 12/1954 | Shepherd | 248/125 |
| 2,703,690 | 3/1955 | Petrick et al. | |
| 2,763,456 | 9/1956 | Breer | 248/186 |
| 2,911,982 | 11/1959 | Guden | 248/122 |
| 3,031,215 | 4/1962 | Vance | |
| 3,089,028 | 5/1963 | Klampferer | 248/122 |
| 3,804,355 | 4/1974 | Uroshevich | |
| 4,671,478 | 6/1987 | Schoenig et al. | |
| 4,744,536 | 5/1988 | Bancalari | |
| 4,966,340 | 10/1990 | Hunter | |
| 5,078,351 | 1/1992 | Gualtieri | |
| 5,174,531 | 12/1992 | Perakis | 248/12 X |
| 5,181,681 | 1/1993 | Edwards | |
| 5,236,160 | 8/1993 | Sechleski | 248/125 |
| 5,319,816 | 6/1994 | Ruehl | 248/121 X |

FOREIGN PATENT DOCUMENTS

| | | | |
|---|---|---|---|
| 6754 | of 1922 | Netherlands | 248/286 |

Primary Examiner—Ramon O. Ramirez
Assistant Examiner—Korie H. Chan
Attorney, Agent, or Firm—Shlesinger, Arkwright & Garvey

[57] ABSTRACT

An apparatus for self-administering fluids in patients, children, and persons of limited capabilities, includes a base, a first generally cylindrical, elongate support that extends upwardly from the base, a second generally cylindrical, elongate support that extends generally upwardly from the first support. The second support is pivotable relative to the first support and assumes first and second positions. The second support in the first position and the first support extend generally in a common direction. The second support in the second position extends generally perpendicular to the first support. The second support is rotatable a complete revolution about the first support.

14 Claims, 3 Drawing Sheets

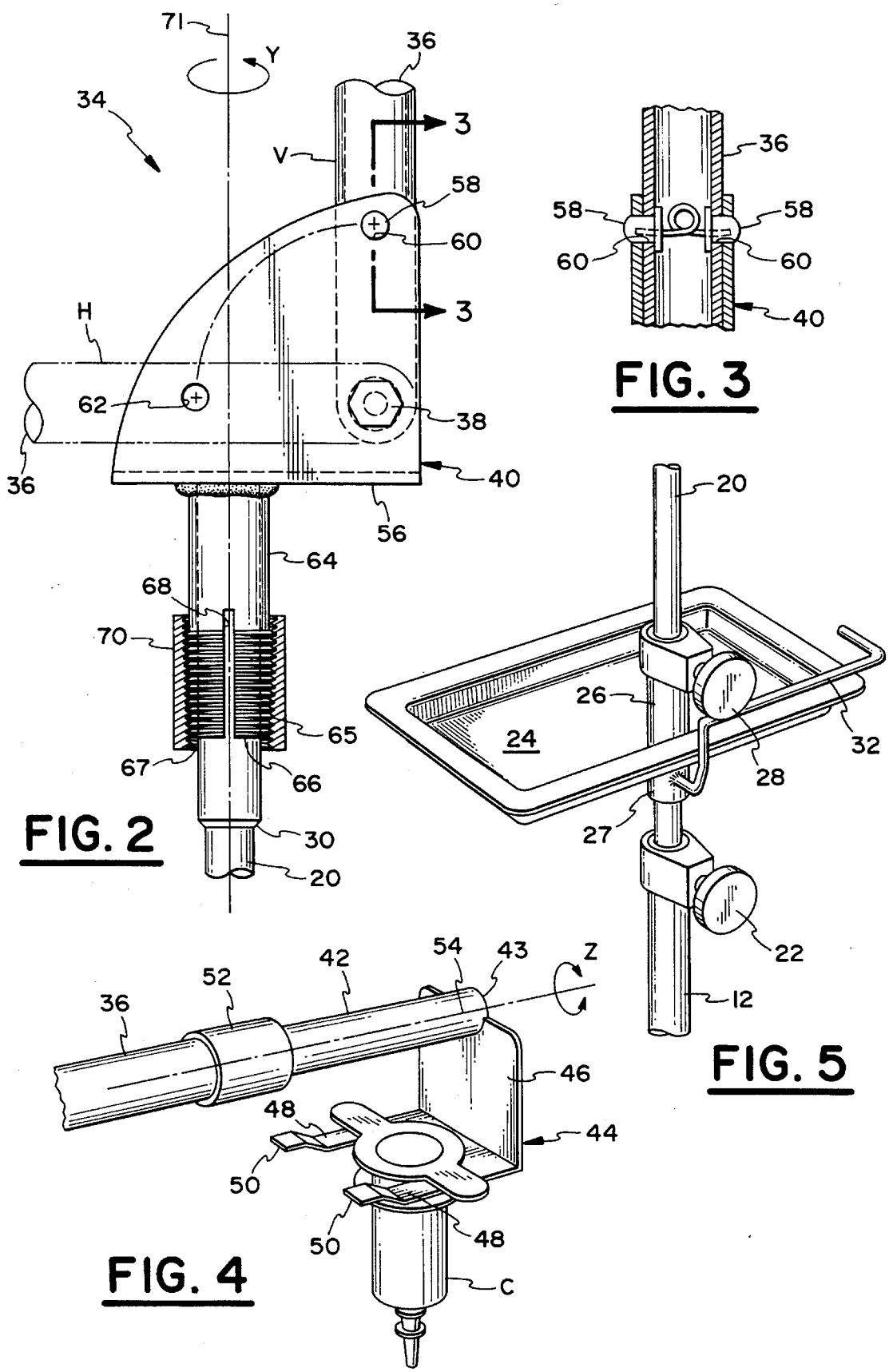

APPARATUS FOR SELF-ADMINISTERING FLUIDS IN PATIENTS, CHILDREN AND PERSONS OF LIMITED CAPABILITIES

FIELD AND HISTORICAL BACKGROUND OF THE INVENTION

The present invention is directed to an apparatus for holding containers of medication for a patient and, more particularly, to an apparatus for self-administering fluids in patients, children and persons of limited capabilities.

In hospitals and other facilities providing medical care, it is a common practice to utilize devices that support containers for administering medication or other fluids in patients. Typically, the container is suspended at an elevated level enabling the fluid to flow by gravity into the patient. It is not uncommon, however, that when administering certain fluids, such as gastric and related fluids, medical personnel, hold feeding tubes and related materials in place during regular, 45 minute sessions. In one day's feeding, therefore, up to three man hours of medical supervision may be required. In addition, with the increasing cost of hospital care, more and more patients are remaining at home or being taken care of in non-hospital environment, where medical supervision is either unavailable or not possible due to economic and other reasons.

U.S. Pat. Nos. 4,744,536 and 4,966,340, disclose conventional apparatus for holding containers for medical fluids. These apparatus, however, are upstanding in nature and do not offer the flexibility needed for use in homes or where medical supervision is not continuously available.

U.S. Pat. Nos. 2,703,690; 3,031,215; 3,804,355; 4,671,478; 5,078,351; and 5,181,681, disclose various stand apparatus.

In view of the drawbacks associated with conventional devices, there is a need in the art for an apparatus for holding containers of medication which can be easily and conveniently used for self-administering fluids in patients, children and persons of limited capabilities.

OBJECTS AND SUMMARY OF THE INVENTION

The principal object of the present invention is to provide an apparatus for self-administering fluids in patients, children, and persons of limited capabilities, which allows for automatic feeding and eliminates continuous medical supervision.

Another object of the present invention is to provide an apparatus for self-administering fluids in patients, children, and persons of limited capabilities, which offers flexibility and is highly useful for hospital and in-home medical care.

Yet another object of the present invention is to provide an apparatus for self-administering fluids in patients, children, and persons of limited capabilities, which can be easily disassembled for transportation purposes, and further is easy to assemble for use.

An additional object of the present invention is to provide an apparatus for self-administering fluids in patients, children, and persons of limited capabilities, which facilitates efficient feedings and offers better control in that the container carrying the fluid is suspended directly over the person.

Yet an additional object of the present invention is to provide an apparatus for self-administering fluids in patients, children, and persons of limited capabilities, in which the container carrying the fluid is reachable from a sitting position.

A further object of the present invention is to provide an apparatus for self-administering fluids in patients, children, and persons of limited capabilities, in which the member that supports the container carrying the fluid can be rotated a complete revolution about the main upstanding support for improved maneuverability.

In summary, the main object of the present invention is to provide an apparatus for self-administering fluids in patients, children, and persons of limited capabilities, which offers the flexibility absent in conventional devices and further allows for improved maneuverability.

BRIEF DESCRIPTION OF THE DRAWINGS

The above and other objects and advantages and novel features of the present invention will be become apparent from the following detailed description of the invention illustrated in the accompanying drawings, wherein:

FIG. 2 is an enlarged fragmentary view of the swivel joint head of the device of the present invention;

FIG. 3 is a fragmentary sectional view taken along line 3—3 of FIG. 2;

FIG. 4 is an enlarged fragmentary view of the container support device of the present invention;

FIG. 5 is an enlarged fragmentary view of the shelf of the device of the present invention;

DETAILED DESCRIPTION OF THE INVENTION

Figure 1:
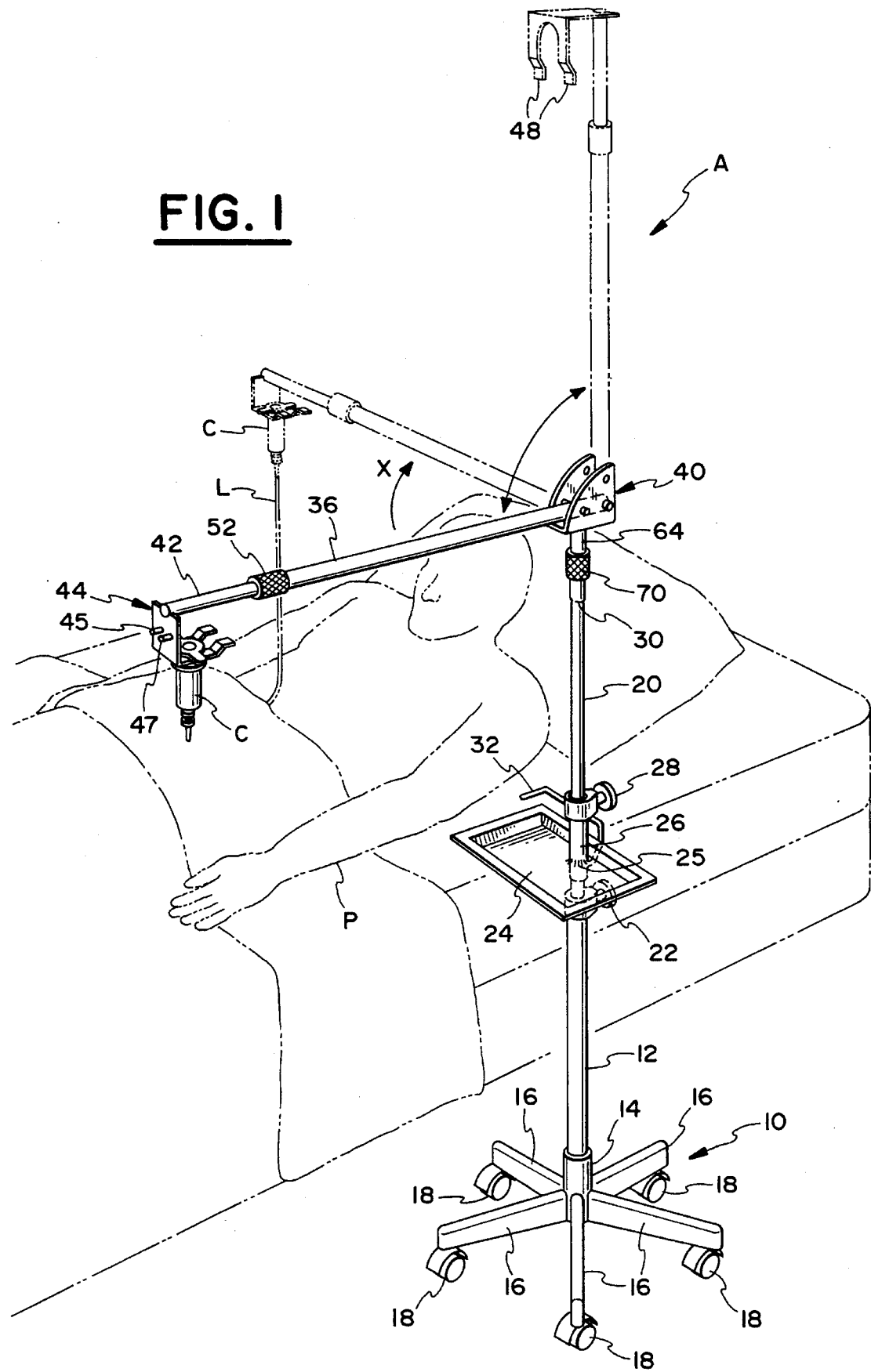
FIG. 1 is a perspective elevational view of the device of the present invention, showing various positions of the container support assembly in broken lines.

The self-administering apparatus of the present invention A, as best shown in FIG. 1, includes a base-stand 10 and a pole 12 extending upwardly in a vertical direction from the base-stand. The base 10 includes hub 14 and five legs 16 extending radially outwardly therefrom. Each leg 16 has a caster or wheel 18 attached to its free end.

The pole 12 is hollow and receives telescopically a rigid rod or tube 20. A conventional locking knob 22 is provided on pole 12 for adjusting the length of rod 20 outside of pole 12. Preferably, a shelf or tray 24 with a small length of tube 26 is slidably positioned on rod 20, see FIG. 5. The position of tray 24 on rigid rod 20 can be adjusted by loosening conventional locking knob 28 and then securing it in place by tightening it. In other words, tube 26, which is mounted to tray 24 by a weld joint 25, slides up and down rod 20 and its relative position can be adjusted by actuating locking knob 28. A portion 27 of tube 26 extends below tray 24 and serves to stop the tray a slight distance above knob 22 thereby allowing access to it. As best shown in FIG. 2, the diameter of rod 20 in its upper portion is made slightly larger such that a shoulder 30 is created therebetween which functions as a stop for fluid container support assembly 34 described below. A handle 32 is welded to the lower end 27 of tube 26 for the ease in handling of tray 24.

The upper fluid container support assembly 34, fully shown in FIG. 1 and partially shown in FIG. 2, includes a support pole 36 pivotally mounted by pin 38 in a generally U-shaped swivel bracket 40. A rigid rod or tube 42 is received telescopically within support pole 36, see FIG. 4. In order to support fluid container C from the apparatus A, a generally G-shaped bracket 44 is mounted at the free end 43 of rod 42. As best shown in FIGS. 1 and 4, bracket 44 comprises a flat vertical plate 46 from which extend two laterally spaced prongs 48. As best shown in FIG. 4, free ends 50 are bent upwardly and then horizontally away from plate 46 to prevent accidental sliding-off of container C therefrom. Two securing, preferably rubber coated, pins 45 and 47 extend from plate 46 for hanging fluid line L during priming of the syringe for feeding.

The rod 42 is provided with conventional retainer or locking ring 52 which permits the user to adjust the length of rod 42 outside of pole 36. In addition, a slight loosening of ring 52 permits the user to pivot and lock in the desired position the fluid container support bracket 44. In other words, the angular position of bracket 44, relative to longitudinal axis 54 of rod 42, can be adjusted, as shown by arrow Z in FIG. 4. It should be noted that while one specific configuration of bracket 44 is shown to support container C, other configurations may be employed to suspend other types of containers used in the medical industry.

As best shown in FIG. 2, support pole 36 is pivotable between a vertical position V and a horizontal position H, indicated by solid and phantom lines in FIG. 2, respectively. As one of ordinary skill in the art would appreciate that the support pole 36 pivots about or equal to 90° between the two positions. In order to lock container support assembly 34 in the two positions, a pair of diametrically opposed spring-loaded projections 58 are provided adjacent the lower end of support pole 36. In the vertical position V, projections 58 are received in opposed holes 60 and in the horizontal position M in the opposed holes 62, provided in swivel bracket 40.

In order to mount container support assembly 34 on rod 20, a short length of tube 64 is welded or mounted by other means, on the bottom 56 of swivel bracket 40. At the free end 66, tube 64 has diametrically opposed slits 68 (only one is seen in FIG. 2), and is provided with a screw-threaded retainer or locking ring 70. As best shown in FIG. 2, threads 65 on tube 64 are tapered downwardly, while threads 67 on ring 70 are tapered upwardly, thereby forming a wedge or clamping mechanism. Therefore, when ring 70 is tightened by rotating it counterclockwise (towards the right in FIG. 2), the gap in the slits 68 would be narrowed, with the effect that end 66 would be clamped onto rigid rod 20. Upon turning ring 70 in the opposite direction, the free end 66 can be unclamped. (It should be noted that other types of mechanical components, parts, means, etc., may also be used to mount the support assembly 34 on rod 20.) In operation, the locking ring 70 is kept somewhat loose such that container support assembly 34 can rotate horizontally a complete revolution about vertical axis 71 of rod 20, as shown by arrows X and Y in FIGS. 1 and 2, respectively.

Figure 6:
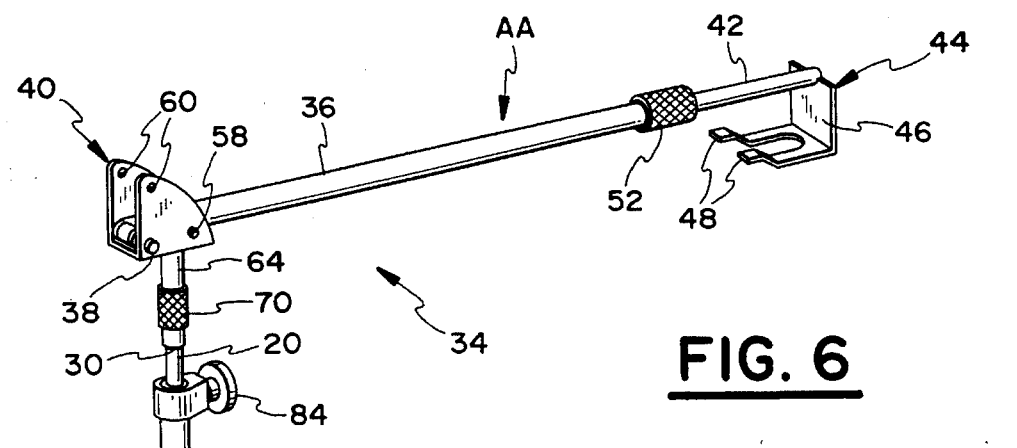
FIG. 6 is an alternate embodiment of the device of the present invention.
Figure 7:
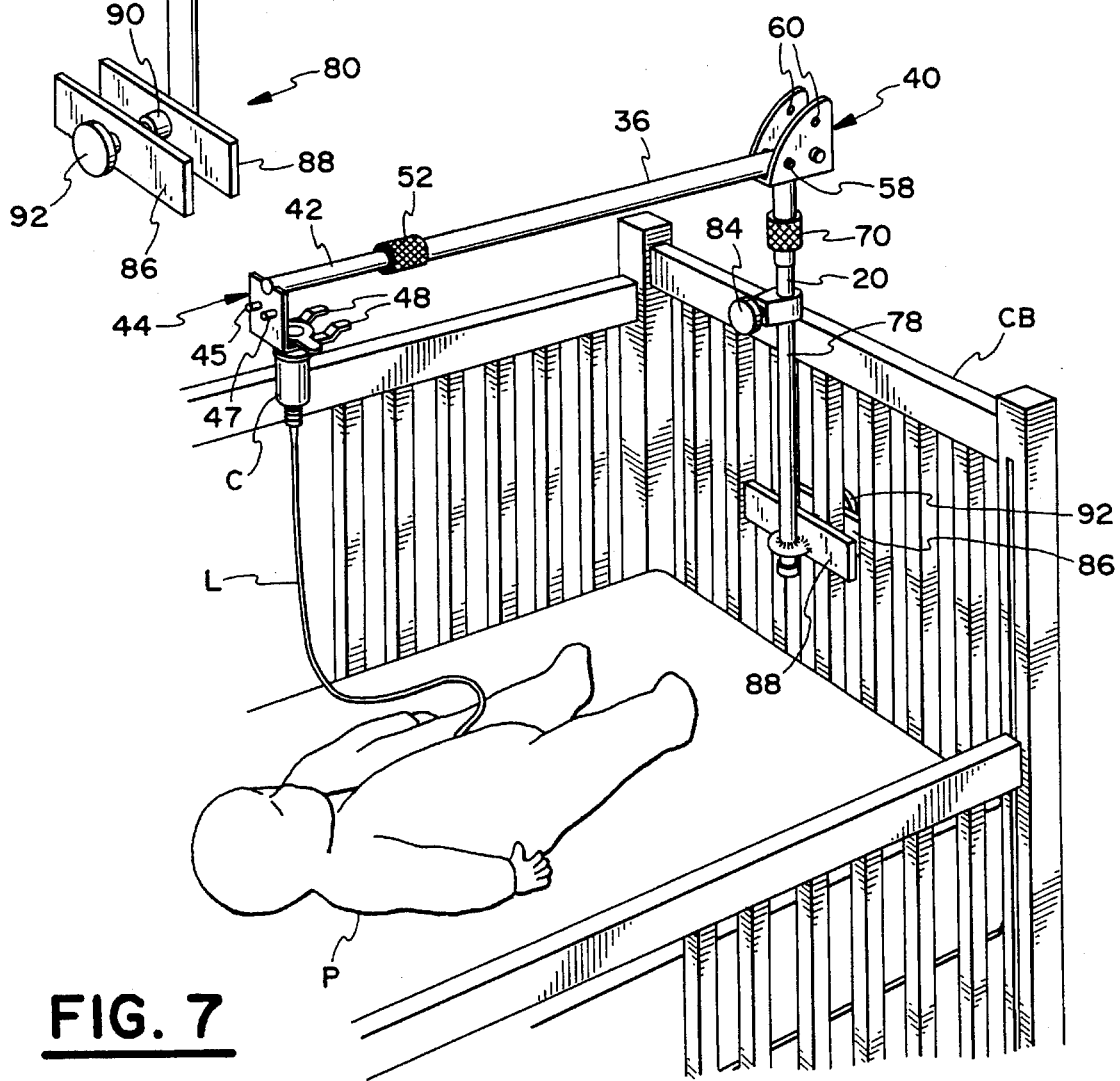
FIG. 7 shows the device of FIG. 6 in use

FIGS. 6–7 disclose another embodiment of the present invention which is not self-standing, but is suitable for mounting to a support structure, such as a crib CB or the like. In this embodiment, parts or components that are similar to the first embodiment are designated with the same reference numerals.

The apparatus AA shown in FIG. 6 and 7, is similar to the first embodiment, with the exception that the lower support assembly is slightly different. In particular, a support pole 78 is mounted to a conventional clamping device 80. Rod 20 is telescopically received in pole 78 and its relative position, and effective length, can be varied by actuating locking knob 84. The clamping device 80 includes laterally spaced parallel plates 86 and 88 separated by sleeve 90. A screw fastener 92 is threaded through plates 86 and 88 and sleeve 90, and upon loosening allows plates 86 and 88 to rotate relative to one another and about screw 92 for installation on crib CB in a known manner.

USE AND OPERATION

Use and operation of the apparatus A or AA of the invention is straightforward. The height of either apparatus is first adjusted by actuating knob 22 (apparatus A) or knob 84 (apparatus AA), and adjusting the length of rod 20 outside of pole 12 or 78. The container support assembly 34 is then pivoted to its horizontal position H and automatically locked by spring-loaded projections 58. It is preferable that before pivoting, support assembly 34 be oriented away from the person or patient P to prevent startling or any accidental injury.

Container C is then slipped over prongs 48 of the fluid support G-bracket 44. The fluid line L is then positioned over and connected to the person or patient P. The support assembly 34 is then gently rotated such that container C is positioned over the patient P. (It should be noted that the overall length of the assembly 34, from rod 20 to patient P, can also be adjusted by actuating ring 52 and adjusting the length of rod 42 by pushing inwardly or pulling outwardly of pole 36.) The feeding of the fluid may then begin. Upon completion of the feeding operation, container support assembly 34 may simply be rotated horizontally away from the person.

From the above, it can be seen that the apparatus of the invention provides a significant improvement over conventional devices in terms of efficiency, ease of handling and maneuverability, and elimination of continuous medical supervision.

While this invention has been described as having preferred designs, it is understood that it is capable of further modifications, uses and/or adaptations of the invention following in general the principle of the invention and including such departures from the present disclosure as come within the known or customary practice in the art to which the invention pertains and as may be applied to the central features hereinbefore set forth, and fall within the scope of the invention and of the limits of the appended claims.

What is claimed is:

1. An apparatus for self-administering fluids in patients, children and persons of limited capabilities comprising:

a) a base;

b) a first generally cylindrical elongate support extending generally upwardly from said base;

c) a second generally cylindrical elongate support extending generally upwardly from said first support;

d) said second support being pivotable relative to said first support to assume first and second positions;

e) said second support and said first support extend generally in a common direction in said first position;

f) said second support extends generally perpendicular to said first support;

g) means for freely rotating said second support a plurality of successive revolutions about said first support when said second support assumes said second position;

h) means for adjusting the length of said second support relative to said first support in a horizontal direction;

i) means for adjusting the length of said first support; and j) means for selectively locking said second support in said first and second positions.

2. The apparatus of claim 1, wherein:

a) said second support includes a fluid container support means at the top end thereof.

3. The apparatus of claim 2, wherein:

a) said fluid container support means includes a generally U-shaped bracket.

4. The apparatus of claim 2, wherein:

a) said fluid container support is rotatable relative to said second support.

5. The apparatus of claim 4, and including:

a) means for adjusting the rotational position of said fluid support means relative to said second support.

6. The apparatus of claim 2, wherein:

a) said fluid container support means includes a generally U-shaped bracket and a generally planar support member extending at right angle thereto; and b) said support member includes a pair of laterally spaced pins extending in a direction opposite to said U-shaped bracket.

7. The apparatus of claim 1, and including:

a) shelf means adjustably mounted on said first support.

8. The apparatus of claim 7, wherein:

a) said shelf means is vertically adjustable relative to said first support.

9. The apparatus of claim 7, wherein:

a) said shelf means is rotatable a complete revolution about said first support.

10. The apparatus of claim 1, wherein:

a) said locking means comprises a generally U-shaped bracket; and b) a portion of said second support is received in said bracket.

11. The apparatus of claim 10, wherein:

a) said portion of said second support includes a spring-biased projection; and b) said bracket includes first and second holes for selectively receiving said projection to thereby lock said second support in said first and second positions.

12. The apparatus of claim 10, wherein:

a) said portion of said second support includes a pair of opposed spring-biased projections;

b) said bracket includes first and second opposed arms; and c) each of said arms includes first and second holes for selectively receiving the corresponding projection to thereby selectively lock said second support in said first and second positions.

13. An apparatus for self-administering fluids in patients, children and persons of limited capabilities, comprising:

a) a first generally cylindrical elongate support;

b) a second generally cylindrical elongate support extending generally upwardly from said first support;

c) said second support being pivotable relative to said first support to assume first and second positions;

d) said second support and said first support extend generally in a common direction in said first position;

e) said second support in said second position extends generally perpendicular to said first support;

f) means for freely rotating said second support a plurality of successive revolutions about said first support when said second assumes said second position;

g) means for adjusting the length of said second support relative to said first support in a horizontal direction;

h) means for adjusting the length of said first support; and i) means for locking said second support in said first and second positions;

j) means for supporting said first elongate support.

14. The apparatus of claim 1, and including:

a) a base; and b) said first support extending generally upwardly from said base.

* * * * *